United States Patent [19]

Schwartz et al.

[11] 4,177,243

[45] Dec. 4, 1979

[54] PROCESS FOR PRODUCTION OF PHOSPHATE ROCK SLURRIES HAVING REDUCED WATER CONTENT AND VISCOSITY

[75] Inventors: Joel Schwartz, Ringwood; Joseph P. Fleming, East Brunswick, both of N.J.

[73] Assignee: Diamond Shamrock Corporation, Cleveland, Ohio

[21] Appl. No.: 662,877

[22] Filed: Mar. 1, 1976

[51] Int. Cl.$^2$ .............................................. C01B 25/22
[52] U.S. Cl. ...................................... 423/167; 423/319
[58] Field of Search ...................... 423/167, 320, 319; 302/14, 18, 66; 252/8.5 A

[56] References Cited

U.S. PATENT DOCUMENTS

| 3,035,867 | 5/1962 | Corbett | 302/66 |
| 3,432,209 | 3/1969 | Scott | 302/66 |
| 3,663,477 | 5/1972 | Ahearn | 302/66 |
| 3,928,551 | 12/1975 | Booth | 423/320 |
| 3,957,674 | 5/1976 | Sano et al. | 302/66 |
| 4,042,666 | 8/1977 | Rice et al. | 423/167 |
| 4,044,107 | 8/1977 | Houghtaling | 423/167 |
| 4,049,774 | 9/1977 | Harper et al. | 423/319 |

OTHER PUBLICATIONS

Kirk-Othmer Encyclopedia, vol. 19, pp. 519–520, 1969.

Primary Examiner—O. R. Vertiz
Assistant Examiner—Thomas W. Roy
Attorney, Agent, or Firm—Neal T. Levin; Leslie G. Nunn

[57] ABSTRACT

Addition of sodium naphthaleneformaldehyde sulfonate to phosphate rock slurry in manufacture of phosphoric acid by the wet process permits reduction of the viscosity and/or water content of the slurry so that increased pumpability of the slurry is obtained.

8 Claims, No Drawings

PROCESS FOR PRODUCTION OF PHOSPHATE ROCK SLURRIES HAVING REDUCED WATER CONTENT AND VISCOSITY

BACKGROUND OF THE INVENTION

1. Field of the Invention

This invention relates to an improved process for producing pumpable phosphate rock slurries by reducing water content and/or viscosity of phosphate rock slurries used in the manufacture of phosphoric acid.

2. Description of Prior Art

In the manufacture of phosphoric acid from phosphate rock, a slurry of the rock is ground and pumped through pipes during processing. It is desirable to process the rock as a slurry containing a fixed amount of moisture so that sulfuric acid can be added continuously to the slurry at a uniform predetermined rate. When low grade, poor quality, clay bearing phosphate rock is used, viscosity of the slurry varies. It may be necessary to add moisture (water) to dilute the solids content of the slurry thereby reducing the viscosity of the slurry so that the slurry remains pumpable during the process. However, addition of moisture to the slurry not only reduces the production rate but also requires changes in the sulfuric acid addition rate.

U.S. Pat. No. 114,693—Lewis, issued May 9, 1871 describes grinding of phosphatic materials in the presence of water.

U.S. Pat. No. 1,607,666—de Haen issued Nov. 23, 1926 mentions that sodium naphthensulphonate is not a satisfactory peptizing agent.

There is a definite need for improvements in the manufacture of phosphoric acid by the wet process. These improvements include steps to minimize the moisture content of the slurry, to increase the production rate, to increase fluidity of the slurry, to improve pumpability of the slurry, to increase phosphoric acid yields, to reduce pump wear caused by the high solids slurry and to decrease slurry viscosities.

SUMMARY OF THE INVENTION

An improved process has been discovered for improving pumpability of a phosphate rock slurry by reducing the water content and/or viscosity of a phosphate rock slurry for use in the manufacture of phosphoric acid by the wet process. This process involves addition of an effective amount of sodium naphthaleneformaldehyde sulfonate or as an additive to the phosphate rock slurry to reduce the moisture content of the slurry and/or the viscosity of the slurry. From about 0.015 to about 0.070% solids by weight of the sodium naphthaleneformaldehyde sulfonate based on the % dry rock solids present in the slurry may be added to the slurry to improve its pumpability by reducing its water content and/or viscosity. Water content of the slurry may vary from about 30% to about 50% with the preferred water content being from about 35% to about 45% by weight based on the total weight of the slurry. The naphthaleneformaldehyde sulfonate or may be added to the slurry at any point during preparation or grinding of the slurry.

The sulfonate may be used either to reduce the viscosity of a specific phosphate rock slurry concentration in the manufacture of phosphoric acid, or more importantly to reduce the moisture (water) content of the rock slurry and maintain the viscosity constant. The benefits of this invention include:

1. Permits utilization of low grade, poor quality, clay bearing phosphate rock in wet grinding operation.
2. Increases plant throughput regardless of rock quality.
3. Reduces power requirements for pumping phosphate rock slurries.

DESCRIPTION OF PREFERRED EMBODIMENTS

Sodium naphthaleneformaldehyde sulfonate may be added as a viscosity reductant additive to a phosphate rock slurry at any time during its preparation, that is, before, after or during the grinding of the rock or in the preparation of the slurry after grinding. If the additive is added during the grinding of the phosphate rock, there may be improvement in the comminuting of the mill. If so, the improvement will be shown by smaller particle size in the slurry. A naphthaleneformladehyde sulfonate having a lowest elution volume of from about 61 to about 82% of a total elution volume by gel permeation chromatography is preferred.

Phosphate rock is the oldest and most economical source of crude phosphoric acid. Production of phosphoric acid by the wet process involves the steps of reacting an aqueous slurry of phosphate rock in aqueous sulfuric acid, holding the acidulated slurry until the calcium sulfate crystals grow to adequate size, separating the acid and calcium sulfate by filtration and concentrating the acid to the desired level. The present invention is concerned with preparation of phosphate rock slurry for use in the wet process.

Phosphate rock is found in extensive deposits of sedimentary origin, laid down originally in beds on the ocean floor and subsequently either elevated or redeposited from surface water which percolated through the original beds. Originally, most of the phosphate was in the form of small granules cemented together with calcium carbonate. Subsequently the cementing material leached or weathered away in some deposits, leaving beds of loose granules. In other deposits, geologic pressures converted cemented granules into hard rock.

Apatite, $Ca_{10}(PO_4)_6(F,Cl,OH)_2$, is the principal mineral in the important phosphate rock deposits of the world. The most common apatite is fluorapatite, $Ca_{10}F_2(PO_4)_6$, which occurs primarily in conjunction with calcium carbonate in a mineral called francolite, $Ca_{10}F_2(PO_4)_6 \cdot X CaCO_3$. Many other minerals such as clays occur also in phosphate rock deposits. Sometimes these minerals are present in such small amounts that the mined material can be used as is.

Small quantities of the sodium naphthaleneformaldehyde sulfonate are required to reduce the viscosity of the phosphate rock slurry or to reduce the water content of the slurry while maintaining the viscosity constant. Quantities of from about 0.017 to about 0.068% solids by weight of the sulfonate based on total weight of the dry rock solids present in the slurry may be used. However, the quantity of sulfonate added may be varied over wider limits if necessary to obtain the desired viscosity, pumpability or other slurry property. After the rock slurry is acidified, the sulfonate has little, if any, effect in the process.

Gel permeation chromatography may be used to characterize sodium naphthaleneformaldehyde sulfonate used in this invention. Gel permeation chromatography is an analytical method for separation of the components present in a polymeric material. It is accomplished by separation of the components according to their respective effective molecular volumes.

For a given homologous polymeric material of varying molecular volumes, a gel permeation chromatography packing material may be selected such that the components are effectively separated and their respective profile can be plotted on a chart. Molecular volume, for a given homologous polymeric species, is directly related to its molecular weight and as such a plot of a molecular volume profile can be thought of as a plot of a profile of different molecular weights. The following procedure may be used to characterize sodium naphthaleneformaldehyde sulfonate.

Samples of sodium naphthaleneformaldehyde sulfonate is diluted in distilled water to approximately 0.1% (w/v) solution and pumped through a 4 feet×⅜ inch diameter column of a gel permeation packing at a flow rate of 3 ml/min. The packing is made of polymeric polyethylene dimethylmethacrylate of such pore size that it will separate standard polydextrans in the molecular weight range of 1000 to 2,000,000.

When the effluent is eluted into a differential refractometer and the resultant signal recorded on a strip chart recorder, a chart profile is obtained which shows a change in refractive index of the effluent with time. The time is, at constant flow rate, a direct function of elution volume ($V_e$) through the gel-permeation column.

Each component will elute at a unique finite $V_e$ at constant flow rate of effluent. The molecular volume component corresponding to the highest molecular weight is eluted first and then the decreasing molecular volume components are eluted in decreasing order of elution time. The area generated by the elution from the column, as monitored by the differential refractometer, is directly proportional to the amount of component in the polymeric material with which it is identified. By totaling these areas, one can compute the percent of each component present in a given polymeric material.

The profiles of percent distribution of different molecular weights (directly related to area distribution of molecular volumes) may differ for various sodium naphthaleneformaldehyde sulfonate compositions as they depend upon their polymeric components. The following is a series of tables showing the molecular volume distribution at its respective $V_e$ (elution volume) for each polymeric composition chromatographed.

Samples of sodium naphthaleneformaldehyde sulfonates chromatographed by gel permeation gave the following results:

|  | $V_e$ (ml) | % Area Distribution |
|---|---|---|
| Sample A | 18.0 | 61.0 |
|  | 27.6 | 19.4 |
|  | 30.0 | 10.6 |
|  | 36.0 | 1.1 |
|  | 45.6 | 8.1 |
| Sample B | 18.0 | 81.2 |
|  | 22.5 | 17.8 |
|  | 24.4 | 1.0 |
| Sample C | 18.0 | 30.3 |
|  | 25.8 | 7.0 |
|  | 27.6 | 29.0 |
|  | 46.8 | 9.3 |
|  | 65.4 | 24.3 |

It can be noted from the data that the lowest $V_e$, corresponding to the highest molecular weight, is in the range of 61 to 82% of the total polymer for Samples A and B.

For a fuller understanding of the nature and objects of this invention, reference may be made to the following examples. These examples are given merely to illustrate the invention and are not to be construed in a limiting sense. All parts, proportions and quantities are by weight unless otherwise indicated. The terms %, rpm and cps are used to indicate percent by weight, revolutions per minute and centipoises respectively, in these examples.

EXAMPLE I

Effectiveness of sodium naphthaleneformaldehyde sulfonate samples, as viscosity reductant additives for phosphate rock slurries were determined by the following procedure.

Three phosphate rock slurries (60% solids) were evaluated at three different additive concentrations. These samples are designated as Rock Slurry Samples #1, #2 and #3. The indicated % by weight of each additive shown in Tables I, II and III refers to the percent by weight of the solids in the additive based on the dry weight of the phosphate rock in the slurry.

Initial viscosity of each rock slurry sample was determined using a Brookfield LVT viscometer at 60 rpm with either a No. 2 or No. 3 spindle. Two of the three phosphate rock slurries were prepared from dry rock samples and the third was received and used as a 60% rock slurry in water sample. The two dry rock samples were dispersed in sufficient water to obtain rock slurries containing 60% by weight solids. These slurries were mixed for 5 minutes before measuring their initial viscosities. The as received slurry sample was mixed for 5 minutes before measuring its initial viscosity. After addition of the desired quantity of the additive, each slurry sample was mixed for 4 minutes before its viscosity measured. Each slurry sample (a total of 220 gm) was then stirred in the viscometer for 15 seconds before its viscosity was measured.

After measuring the viscosity of slurry sample after addition of the additive, additional dry powdered phosphate rock was added to several of the slurry samples to determine the quantity of dry powdered rock which had to be added to obtain a viscosity comparative to the initial viscosity. Results of these tests are shown in Tables I, II and III.

TABLE I

| ROCK SLURRY SAMPLE #1 | | | |
|---|---|---|---|
| Brookfield Viscosity in cps using #2 spindle and 60 rpm | | | |
| Additive | Initial | After Additive | After Additional Rock Added |
| 0.0171% additive | | | |
| Sulfonate A | 205 | 165 | 200 (60.9% solids) |
| Sulfonate C | 190 | 185 | — |
| 0.0342% additive | | | |
| Sulfonate A | 205 | 90 | 190 (63.3% solids) |
| Sulfonate C | 195 | 185 | — |
| 0.0684% additive | | | |
| Sulfonate A | 190 | <40 | 190 (65.0% solids) |
| Sulfonate C | 195 | 165 | 200 (61.1% solids) |

TABLE II

ROCK SLURRY SAMPLE #2

Brookfield Viscosity in cps using #2 spindle at 60 rpm

| Additive | Initial | After Additive | After Additional Rock Added |
|---|---|---|---|
| 0.0171% additive | | | |
| Sulfonate A | 265 | 205 | 265 (61.2% solids) |
| Sulfonate C | 260 | 255 | — |
| 0.0342% additive | | | |
| Sulfonate A | 250 | 175 | 260 (61.7% solids) |
| Sulfonate C | 265 | 260 | — |
| 0.0684% additive | | | |
| Sulfonate A | 300 | 135 | 305 (63.8% solids) |
| Sulfonate C | 235 | 200 | 225 (60.7% solids) |

TABLE III

ROCK SLURRY SAMPLE #3

Brookfield Viscosity in CPS using #3 spindle at 60 rpm

| Additive | Initial | After Additive | After Additional Rock Added |
|---|---|---|---|
| 0.0171% additive | | | |
| Sulfonate A | 1460 | 1220 | 1600 (60.7% solids) |
| Sulfonate B | 1450 | 1175 | 1465 (60.9% solids) |
| Sulfonate C | 1450 | 1425 | — |
| 0.0342% additive | | | |
| Sulfonate A | 1600 | 800 | 1600 (62.6% solids) |
| Sulfonate B | 1475 | 650 | 1500 (63.0% solids) |
| Sulfonate C | 1420 | 1100 | 1420 (60.9% solids) |
| 0.0684% additive | | | |
| Sulfonate A | 1400 | 460 | 1240 (64.1% solids) |
| Sulfonate B | 1500 | 325 | 1425 (65.0% solids) |
| Sulfonate C | 1420 | 1100 | 1420 (60.9% solids) |

EXAMPLE II

The procedure of Example I was repeated with Rock Slurry Samples #4 and #5 with the following exceptions.

Rock Slurry Sample #4 contained 65% solids by weight and Rock slurry Sample #5 contained 55% solids by weight. Both slurries were prepared from dry ground phosphate rock and were used to obtain the results in Tables IV and V with the samples of Sulfonate B described above.

TABLE IV

ROCK SLURRY SAMPLE #4

Brookfield Viscosity on cps at 60 rpm using #3 spindle initially and #2 spindle after additive addition

| Additive | Initial | After Additive |
|---|---|---|
| 0.0684% additive | | |
| Sulfonate B | 440 | 260 |

TABLE V

ROCK SLURRY SAMPLE #5

Brookfield Viscosity in cps using #3 spindle and 60 rpm

| Additive | % Additive | Initial | After Additive |
|---|---|---|---|
| Sulfonate B | 0.0342 | 160 | 75 |

While the invention has been described with reference to certain specific embodiments thereof, it is understood that it is not to be so limited since alterations and changes may be made therein which are within the full and intended scope of the appended claims.

What is claimed is:

1. A process for producing an aqueous slurry of ground phosphate rock for use in phosphoric acid manufacture, the process comprising admixing with the slurry, an effective amount of sodium naphthaleneformaldehyde sulfonate to obtain a pumpable slurry having reduced moisture content or reduced viscosity so that the slurry is pumpable during use in phosphoric acid manufacture.

2. The process of claim 1 wherein the sodium naphthaleneformaldehyde sulfonate has a lowest elution volume of from about 61% to about 82% of a total elution volume by gel permeation chromatography.

3. The process of claim 1 wherein the effective amount of the sulfonate is from about 0.015 to about 0.070% solids by weight of the sulfonate based on % dry rock solids present in the slurry.

4. The process of claim 1 wherein the slurry contains from about 30 to about 50% by weight of water.

5. The slurry produced by the process of claim 1.

6. The process of claim 2 wherein the effective amount of the sulfonate is from about 0.015 to about 0.070% solids by weight of the sulfonate based on % dry rock solids present in the slurry.

7. The process of claim 2 wherein the slurry contains from about 30 to about 50% by weight of water.

8. The slurry produced by the process of claim 2.

* * * * *